US010803006B1

(12) United States Patent
Xu et al.

(10) Patent No.: US 10,803,006 B1
(45) Date of Patent: Oct. 13, 2020

(54) PERSISTENT MEMORY KEY-VALUE STORE IN A DISTRIBUTED MEMORY ARCHITECTURE

(71) Applicant: MemVerge, Inc, San Jose, CA (US)

(72) Inventors: Ning Xu, Shanghai (CN); Jiajie Sun, Shanghai (CN); Yuanjie Wu, Shanghai (CN); Yue Li, Fremong, CA (US); Jie Yu, Shanghai (CN); Robert W Beauchamp, Berlin, MA (US)

( * ) Notice: Subject to any disclaimer, the term of this patent is extended or adjusted under 35 U.S.C. 154(b) by 87 days.

(21) Appl. No.: 16/372,262

(22) Filed: Apr. 1, 2019

(51) Int. Cl.
*G06F 15/173* (2006.01)
*G06F 9/30* (2018.01)
*G06F 9/50* (2006.01)

(52) U.S. Cl.
CPC ...... *G06F 15/17331* (2013.01); *G06F 9/3004* (2013.01); *G06F 9/5016* (2013.01); *G06F 9/5022* (2013.01)

(58) Field of Classification Search
CPC ..... G06F 9/00; G06F 9/06; G06F 9/30; G06F 9/30003; G06F 9/3004; G06F 9/46; G06F 9/50; G06F 9/5011; G06F 9/5016; G06F 9/5022; G06F 15/00; G06F 15/16; G06F 15/161; G06F 15/163; G06F 15/173; G06F 15/17306; G06F 15/17331
See application file for complete search history.

(56) References Cited

U.S. PATENT DOCUMENTS

| 10,572,161 | B2* | 2/2020 | Subramanian | G06F 15/17331 |
| 2009/0172044 | A1* | 7/2009 | Page | G06F 16/20 |
| 2014/0172898 | A1* | 6/2014 | Aguilera | G06F 16/2452 707/759 |
| 2017/0046234 | A1* | 2/2017 | Yang | G06F 16/2365 |
| 2017/0103039 | A1* | 4/2017 | Shamis | H04L 67/1097 |
| 2017/0149890 | A1* | 5/2017 | Shamis | G06F 15/17331 |
| 2018/0300203 | A1* | 10/2018 | Kathpal | G06F 16/278 |
| 2019/0079834 | A1* | 3/2019 | De Schrijver | G06F 16/27 |
| 2019/0332692 | A1* | 10/2019 | Rachapudi | G06F 16/1844 |

OTHER PUBLICATIONS

Shan et al., "Distributed Shared Persistent Memory", Purdue University (Year: 2017).*

* cited by examiner

*Primary Examiner* — Michael A Keller
*Assistant Examiner* — Boris D Grijalva Lobos

(57) ABSTRACT

The current disclosure is directed towards providing methods and systems enabling a plurality of key-value stores to be persisted within a single direct access memory space comprising persistent memory, and further enabling a single key-value store to be implemented via a plurality of memory spaces. In one embodiment, a method comprising: creating a first create-key-value-store operation-performed entry in a global log persisted within a first memory space; allocating a first key-value store name and a first key-value store root address within a second memory space; persisting the first key-value store name and the first key-value store root address within a first local log of the second memory space; updating the global log of the first memory space to include the first key-value store name and the first key-value store root address; and adding the first key-value store name and the first key-value store root address to a meta key-value store.

14 Claims, 6 Drawing Sheets

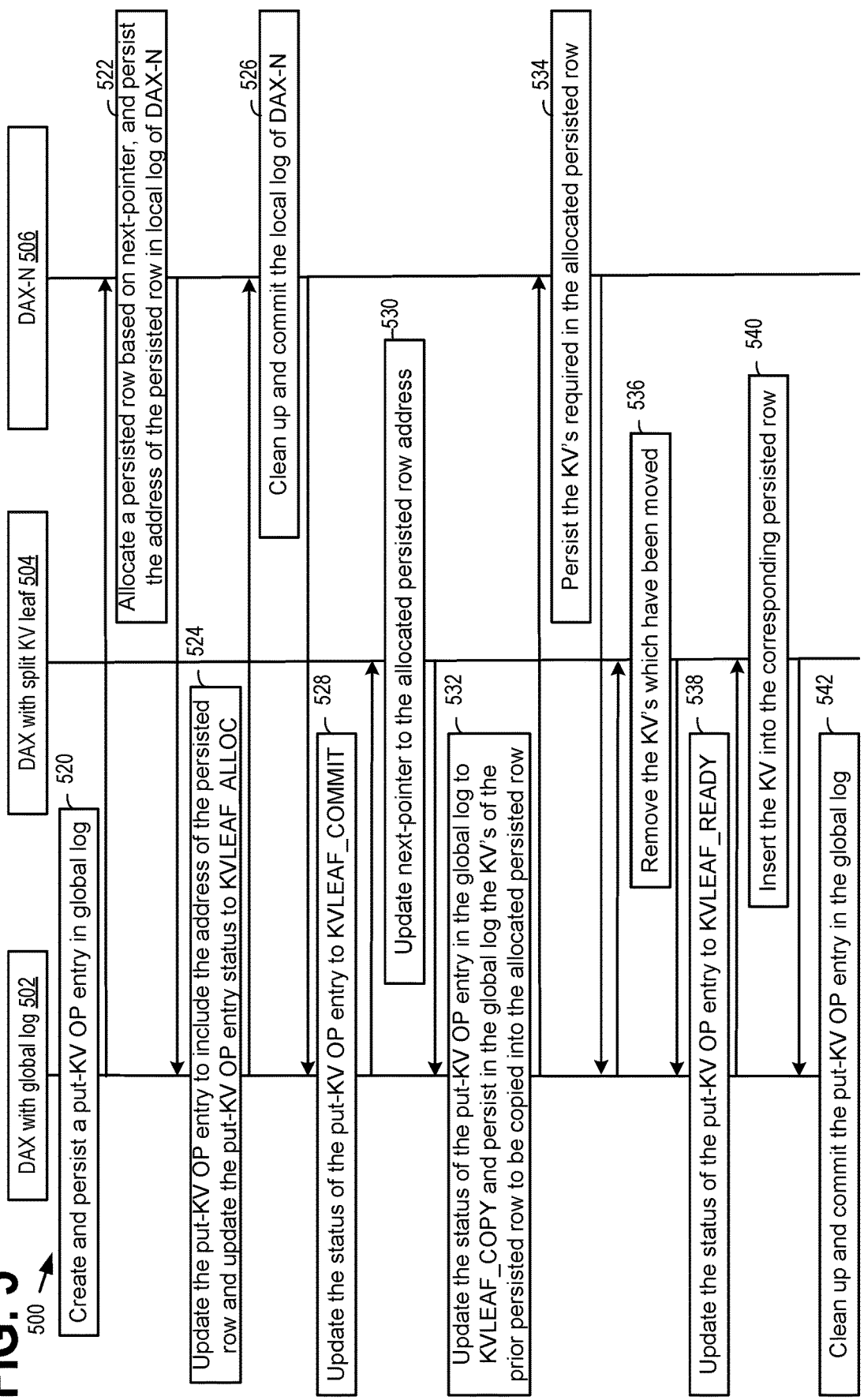

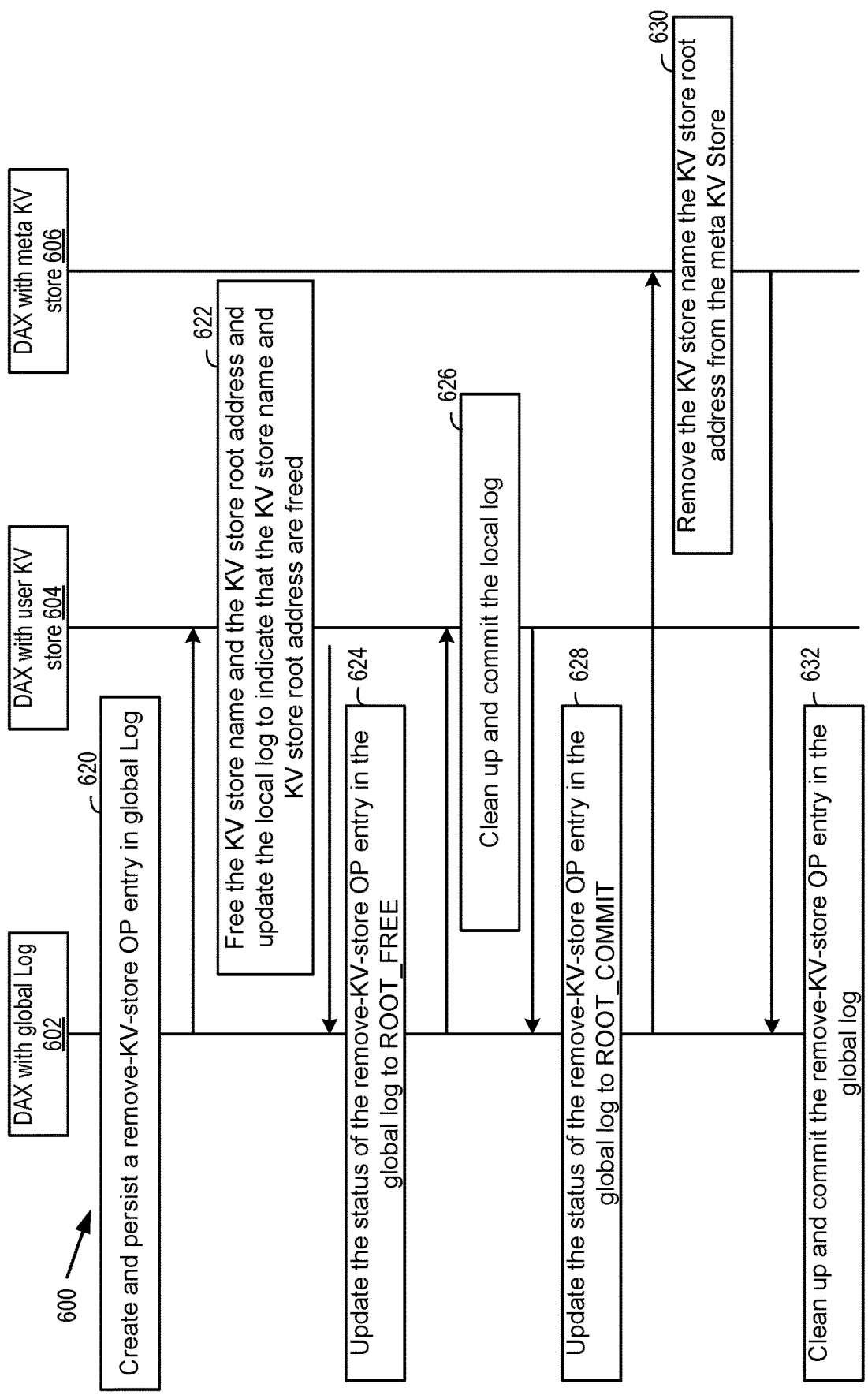

PERSISTENT MEMORY KEY-VALUE STORE IN A DISTRIBUTED MEMORY ARCHITECTURE

CROSS-REFERENCE TO RELATED APPLICATION(S)

This Application claims the benefit of and priority to U.S. Provisional Patent Application Ser. No. 62/713,537, filed on Aug. 2, 2018 for "Distributed Memory Object Architecture that Enables Memory-Speed Data Access for both Memory Semantics and Storage Semantics in a Distributed Environment", and 2) U.S. Non-provisional patent application Ser. No. 16/255,414, filed on Jan. 23, 2019 for "A Distributed Memory Object Architecture", the entire disclosure of which are incorporated herein by references.

TECHNICAL FIELD

The present disclosure relates generally to distributed computing environments, and more particularly, to systems and methods for key-value stores implemented on persistent memory in a distributed memory architecture.

BACKGROUND

Non-volatile random access memory (NVRAM, herein also referred to as persistent memory) is differentiated from dynamic random access memory (DRAM) in that data stored in NVRAM persists even after power to the NVRAM device is lost, such as after a power cycle. NVRAM therefore provides the low latency of DRAM, while also providing a means for long term data storage, thus providing a low latency alternative to conventional storage media such as HDDs or SSDs.

The low latency data storage capabilities of NVRAM make it especially attractive for use in remote storage systems, wherein the ability to rapidly store and retrieve data are of central importance. NVRAM may be further leveraged in distributed remote storage systems, wherein a single data set may be distributed amongst a number of data nodes or memory spaces, therefore relying on additional inter-node data retrieval and data storage.

Despite the utility of NVRAM, the inventors herein have identified several issues with employing NVRAM in a distributed remote storage context. In one example, within a single NVRAM memory space employing remote direct memory access (RDMA, herein also referred to as a DAX), there may be challenges associated with storing more than a single key-value (KV) store therein. For example, in order to store multiple key-value stores within a single DAX, one or more pieces of meta data pertaining to the key-value stores may need to be accessed, and storing this meta data in such a way that it may be dynamically updated as key-value stores are added or removed from the DAX, without increasing latency, is an unresolved challenge. This may inhibit storage of more complicated data structures/data sets within a DAX. In another example, modern data sets may comprise large amounts of data, which may be unable to fit within a single key-value store within a single DAX.

It is therefore desirable to provide low-latency memory spaces, such as a DAX implemented on NVRAM, that may store more than a single key-value store within a single NVRAM DAX. It is further desirable to provide a key-value store that can exceed the memory capacity of a given NVRAM DAX, such as may be implemented by a single node in a remote storage system comprising a cluster of data nodes

SUMMARY

The current disclosure provides methods and systems enabling a plurality of key-value stores to be implemented within a single DAX and further enabling a single key-value store to be implemented over a plurality of DAXs. In one example, the current disclosure provides for a method comprising: creating a first create-key-value-store operation-performed entry in a global log persisted within a first memory space; allocating a first key-value store name and a first key-value store root address within a second memory space; persisting the first key-value store name and the first key-value store root address within a first local log of the second memory space; updating the global log of the first memory space to include the first key-value store name and the first key-value store root address; and adding the first key-value store name and the first key-value store root address to a meta key-value store. In this way, a global log may maintain a record within persistent memory of the status of one or more operations occurring within a distributed computing environment implementing a key-value store on persistent memory, thereby enabling efficient recovery of a previous system state if all or part of the distributed computing environment loses power. As an example, an operation-performed entry within the global log may comprise a status indicating a degree of completion of the operation, and in the event of node failure causing execution of the operation to fail, resuming execution of the operation by evaluating the status of the operation stored in the global log, and responsive to an indication that the operation is incomplete, re-initiating execution of the operation from a previous completion point, such that redundant computations may be reduced. Further, by recording the key-value store name and the key-value store root address within a meta key-value store for each key-value store created within a single memory space, a plurality of key-value stores may be implemented within a single DAX.

In a second example, the current disclosure provides for a persistent memory key-value store system comprising: a plurality of data nodes, wherein the plurality of data nodes comprise a persistent memory device, a processor, and a network interface to send and receive messages and data, wherein the network interface operates on remote direct memory access; a first distributed memory space implemented by the plurality of data nodes, wherein a global log is persisted within persistent memory of the first distributed memory space; a second distributed memory space implemented by the plurality of data nodes, wherein a meta key-value store is persisted within persistent memory of the second distributed memory space; and a third distributed memory space implemented by the plurality of data nodes, wherein a first key-value store and a second key-value store are persisted within persistent memory of the third distributed memory space. By providing a global log in a first memory space, wherein the global log may record a status of one or more key-value store operations occurring within a plurality of memory spaces, operations occurring across multiple memory spaces may be more efficiently executed, and failure of one or more operation steps at one or more nodes of the system may be readily compensated for rapid determination of a previous point of completion of an incomplete operation.

In a third example, the current disclosure provides a persistent memory key-value store system comprising: a plurality of nodes, wherein the plurality of nodes comprise a plurality of persistent memory devices, a processor, and a network interface to send and receive messages and data, wherein the network interface operates on remote direct memory access; a first memory space implemented by the plurality of nodes, wherein the first memory space comprises a global log of operations-performed within the persistent memory key-value store system; a second memory space implemented by the plurality of nodes, wherein the second memory space comprises a meta key-value store, wherein the meta key-value store comprises a plurality of key-value pairs comprising a plurality of key-value store names and key-value store root addresses; a third memory space implemented by the plurality of nodes, wherein the third memory space comprises a local log; and machine executable instructions executable by the persistent key-value store system to: generate a new key-value store request; respond to the new key-value store request by: creating a first create-key-value-store operation-performed entry in the global log; allocating a key-value store name and a key-value store root address within the third memory space; persisting the key-value store name and the key-value store root address within the local log of the third memory space; updating the global log to include the first key-value store name and the first key-value store root address; and adding the key-value store name and the key-value store root address as a key-value pair to the meta key-value store. In this way, key-value stores may be created and efficiently accessed, by storing the root address and name of each key-value store within a meta key-value store, thereby enabling a plurality of key-value stores to be held within a single DAX. Further, by persisting a global log within a first memory space, wherein the global log maintains a record of the various operations performed by the plurality of nodes, and creating and persisting key-value stores in a third memory space, wherein the third memory space is separate from the first memory space, if an operation occurring within the third memory space fails to complete (for example, because of a power failure) a record of the status of the operation within the global log maintained within the first, separate memory space may enable rapid recovery and continuation of the incomplete task.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of systems and methods will now be presented in the detailed description by way of example, and not by way of limitation, with reference to the accompanying drawings, wherein:

FIG. 5 shows a high level flow diagram of a method for adding a key-value pair to a key-value store.

FIG. 6 shows a high level flow diagram of a process for removing a key-value store.

DETAILED DESCRIPTION

In conventional approaches, there may be challenges associated with storing more than a single key-value store (key-value may be abbreviated herein as KV) within a single direct access memory space (DAX), or in storing a single key-value store across multiple direct access memory spaces. In one example, a root address for a key-value store may be persisted within the root of a DAX, and therefore it is conventional to store a single key-value store within a single DAX, as a DAX comprises a single root. Therefore, in order to store multiple key-value stores within a single DAX, one or more pieces of meta data pertaining to the key-value stores may need to be stored within the DAX root, and accessed (such as during key-value pair insertion or removal). Currently, no method enables efficient and dynamic retrieval and updating of key-value store meta data from the DAX, without significantly increasing latency. Further, as the memory capacity of any single node/memory space/DAX may be limited, it would be advantageous to provide for a single key-value store capable of surpassing the storage capacity of a single node, by implementing the key-value store across a plurality of memory spaces, which may correspond to a plurality of nodes. However, coordinating key-value store operations in a key-value store distributed amongst a plurality of memory spaces may result in operation failure if all, or part, of the multi-node key-value store system fails, such as may be the case in a power outage or attack by a malicious actor. For example, if a key-value pair in a key-value store distributed across a plurality of memory spaces is commanded to move a first key-value pair from a first memory space, to a second memory space, wherein the first and second memory spaces are implemented by separate nodes, power failure of the first or second node may compromise this task, and the task may need to start over from the beginning, resulting in redundant execution of steps/computations. By recording a status/degree of completion of a task in a global log, persisted within a memory space, wherein the memory space is separate from the memory space(s) in which the task is being executed, a task which fails to complete may be efficiently resumed from a previous point of completion based upon evaluation of the corresponding status of the task in the global log.

The current disclosure may at least partially mitigate some of the above issues by providing methods and systems for enabling a plurality of key-value stores to be implemented within a single memory space and further enabling a single key-value store to be implemented across a plurality of memory spaces, wherein the memory spaces may comprise persistent memory (PMEM). The disclosure further provides for efficient failure recovery of key-value stores persisted within PMEM.

Figure 1:
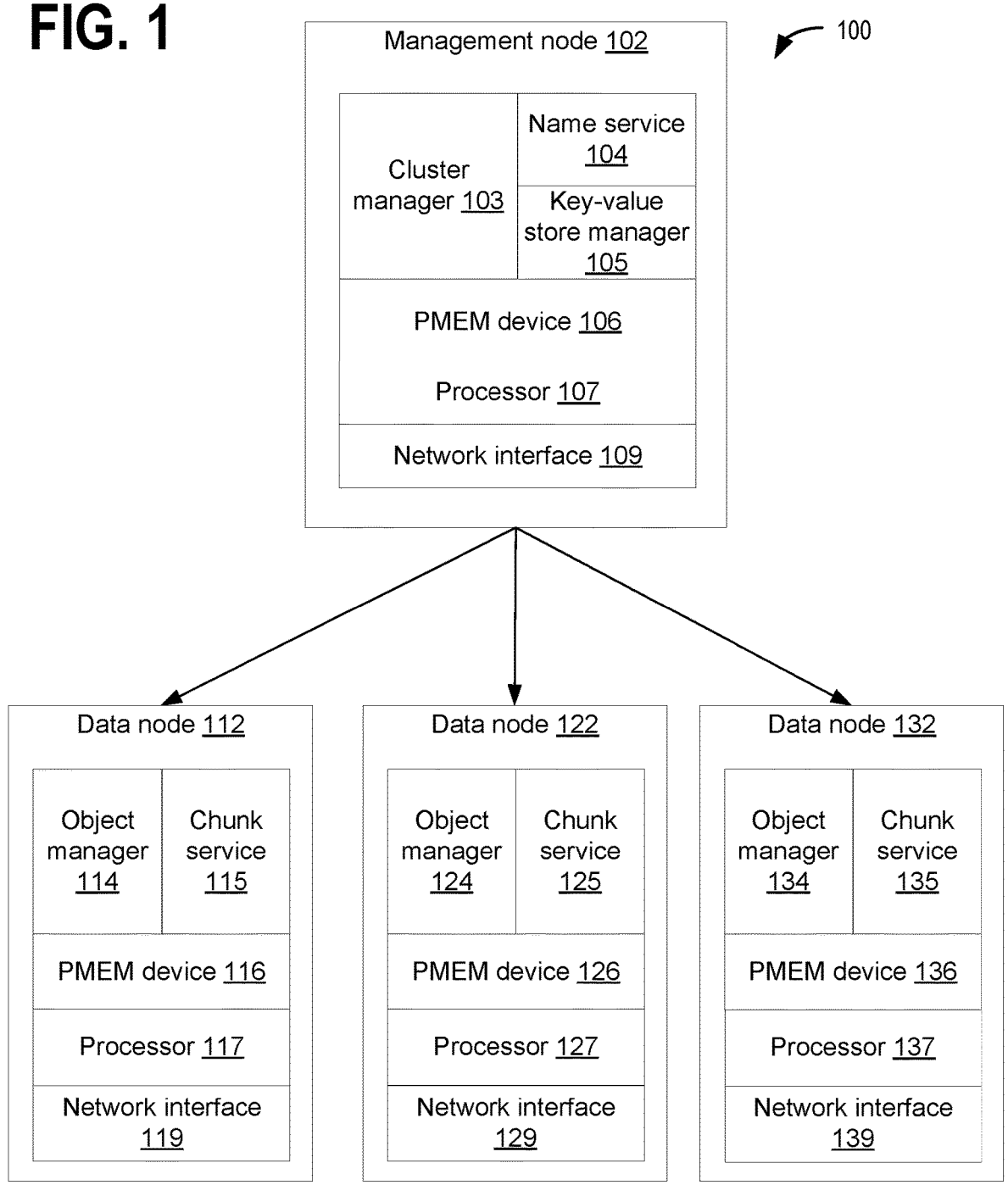
FIG. 1 is an illustration of a persistent memory key-value store system comprising a management node and a plurality of data nodes.
Figure 2:
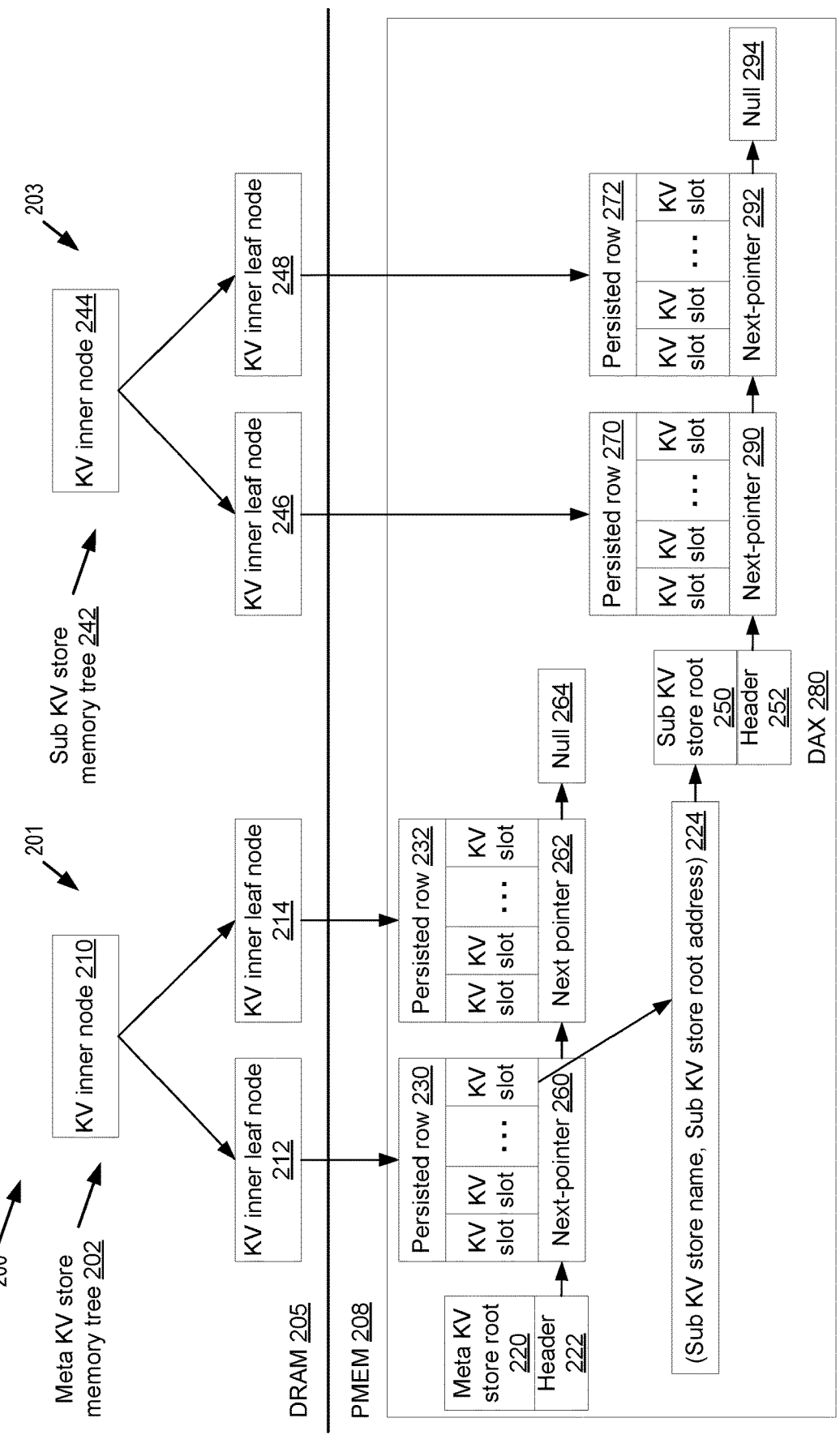
FIG. 2 is an illustration of a key-value store and a meta key-value store within a single memory space.
Figure 3:
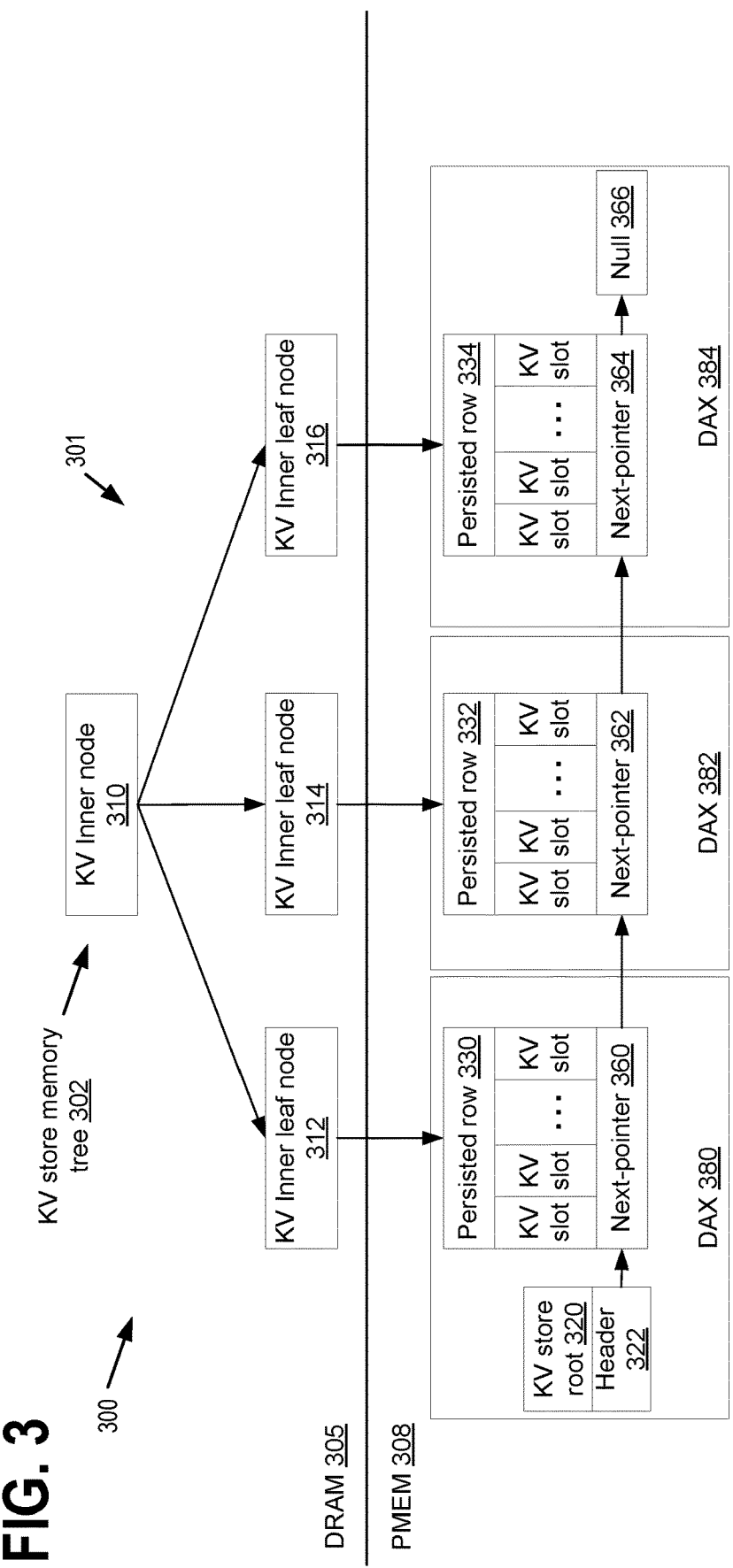
FIG. 3 is an illustration of a single key-value store distributed across multiple memory spaces.
Figure 4:
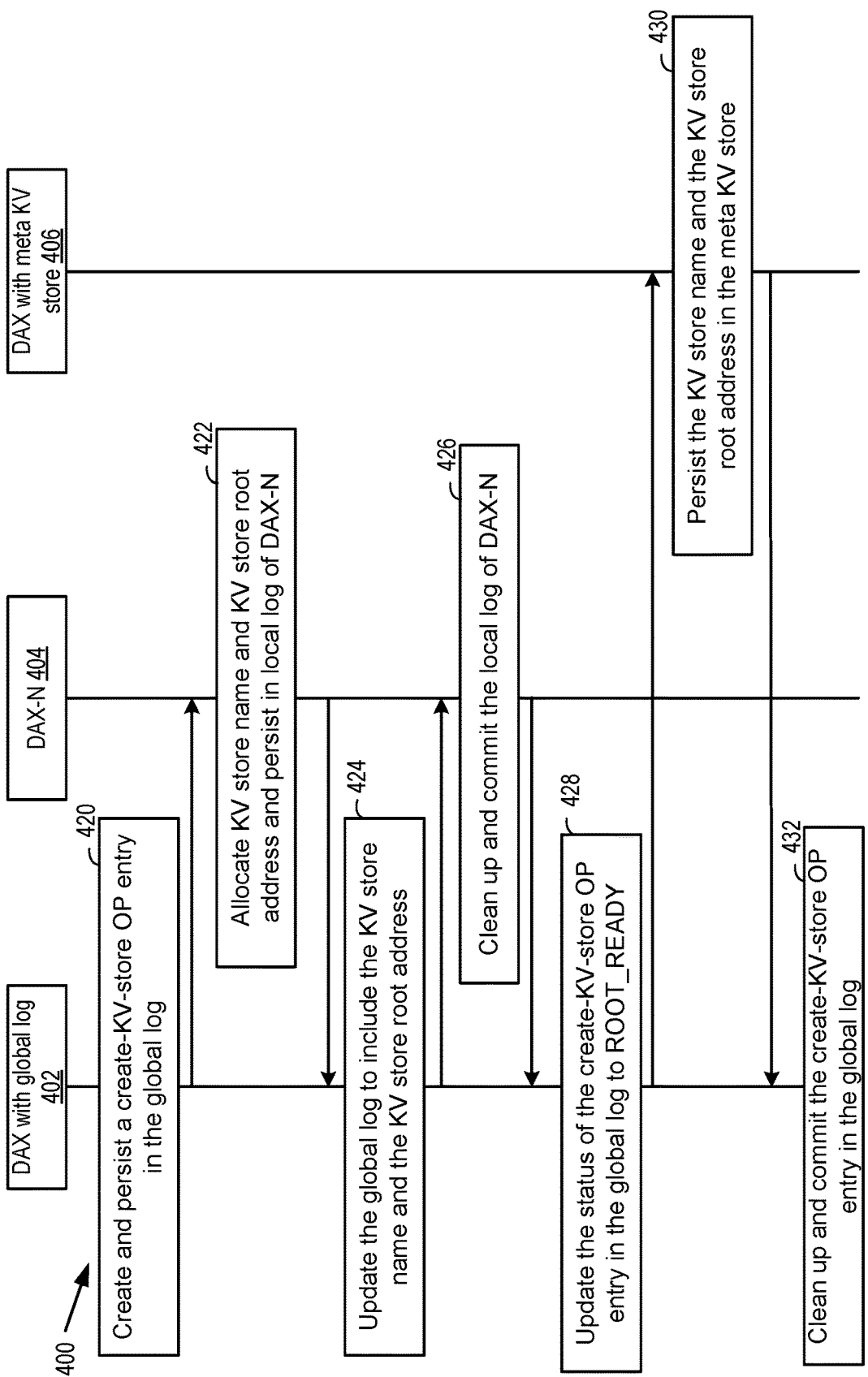
FIG. 4 shows a high level flow diagram of a method for creating a new key-value store.

FIG. 1 shows one example of a persistent memory key-value store system, which comprises a cluster of nodes configured to create, maintain, and store data within a plurality of memory spaces, wherein the memory spaces may be implemented via one or more persistent memory devices (PMEM devices). FIG. 2 shows one example architecture which may be implemented by the PMEM key-value store system of FIG. 1, for storing a plurality of key-value stores within a single memory space by employing a meta key-value store to mitigate namespace conflicts. FIG. 3 shows one example architecture which may be implemented by the PMEM key-value store system of FIG. 1, for distributing a single key-value store across a plurality of memory spaces, thereby increasing a total storage capacity of a single key-value store. FIG. 4 shows an example flow diagram of a method/process for creating a key-value store within a memory space. FIG. 5 shows an example flow diagram of a method/process for inserting a key-value into a pre-existing key-value store, wherein the preexisting key-value store may be distributed across a plurality of memory spaces. FIG. 6 shows an example of a flow diagram of a method/process for removing a key-value store. The methods depicted in FIGS. 4-6 may be executed by the PMEM key-value store system of FIG. 1 based on machine executable instructions stored therein.

As the term is used herein, RDMA is a technology that allows a network interface device to transfer data "directly" to or from memory of a remote device, that is, transferring the data to or from the memory without involving the central processing unit(s) (CPUs) on the remote device.

Persistent memory (PMEM) refers to the storage of data structures such that the data may continue to be accessed using memory instructions, e.g., load and store, even after completion of the process that created or modified the data structures. The terms PMEM and NVRAM may be used interchangeably herein.

Turning first to FIG. 1, an example PMEM key-value store system 100 is shown. PMEM key-value store system 100 may comprise a cluster of nodes, wherein the cluster may comprise a management node 102, and a plurality of data nodes, such as data node 112, data node 122, and data node 132. Although only three data nodes are shown in FIG. 1, it will be appreciated that any number of data nodes may be included within PMEM key-value store system 100. Each node within PMEM key-value store system 100 may be communicatively coupled to one or more other nodes within the PMEM key-value store system 100 via a network interface, such as network interface 109, network interface 119, network interface 129, and network interface 139. Each network interface may be configured to send and receive messages from the other nodes of PMEM key-value store system 100. The network interfaces of PMEM key-value store system 100 may be further configured to read and write directly to memory of a node via RDMA, thereby reducing latency of read/write operations by bypassing the operating system of the respective nodes involved in the read/write operation.

Each node of PMEM key-value store system 100 may also comprise a processor, such as processor 107, processor 117, processor 127, and processor 137, coupled to at least a first memory device and configured to execute machine readable instructions stored within the memory device. In one example, the machine readable instructions may be stored in non-transitory memory, such as PMEM device 110, PMEM device 116, PMEM device 126, and PMEM device 137, or other memory devices. The PMEM devices of the PMEM key-value store system 100, including PMEM device 110, PMEM device 116, PMEM device 126, and PMEM device 136, may comprise any type of NVRAM, such as magneto resistive RAM (MRAM).

PMEM key-value store system 100 may comprise a plurality of nodes (herein also referred to as a cluster of nodes). In one example, a single management node is elected via a consensus protocol executed by each of the plurality of nodes, to manage operations within the cluster. In another example, management operation may be executed according to a distributed protocol executed by the plurality of nodes comprising the node cluster, such that management operations are distributed.

Management node 102 may comprise a processor 107, which may enable management node 102 to execute machine readable instructions. Management node 102 may further comprise cluster manager 103. In one example, cluster manager 103 comprises instructions stored in non-volatile memory of management node 102. Although the example shown in FIG. 1 shows cluster manager 103 on only a single node, it will be appreciated that cluster manager 103 may be stored on each node of PMEM key-value store system 100, thereby enabling any node within PMEM key-value store system 100 to serve as the management node of the system, thereby increasing robustness and stability of the PMEM key-value store system 100, as failure of a current management node may be efficiently handled by electing a new management node. The cluster manager 103 mediates cluster membership (addition or removal of data nodes from PMEM key-value store system 100), node ID assignment, and the name service 104. The cluster manager 103 may select nodes to execute key-value store operations. In one example, cluster manager 103 may allocate space in PMEM device 116 to store a new key-value store based on an indication that PMEM device 116 has greater than a threshold of unallocated space and further based on a new key-value store creation request. Cluster manager 103 may determine which data node(s) is/are to implement a memory space and/or determine the information to be stored within each memory space of PMEM key-value store system 100. In one example, cluster manager 103 may allocate space within PMEM device 126 to store a meta key-value store, wherein the meta key-value store may comprise a plurality of key-value pairs corresponding to the root address and name of a plurality of key-value stores within PMEM key-value store system 100.

Management node 102 further comprises name service 104. Name service 104 may comprise a hash-distributed service which provides mapping of a distributed memory object (DMO) name string to its object ID and the object owner. The service is hash distributed across a set of nodes in the PMEM key-value store system 100. In the present example, the set of nodes is a name service group that is determined by the cluster manager. Name service 104 may map the plurality of names of DMOs to information pertaining to the DMO, such as the memory address at which the DMO is stored, the DMO owner, etc. Name service 104 may comprise a shared information infrastructure for locating, managing, administering and organizing DMOs, which may comprise network resources such as volumes, folders, files, groups, devices, telephone numbers and other objects. Name service 104 may store the map of DMO names and corresponding information as key-value pairs in key-value stores, such as the key-value stores discussed in more detail herein. As an example, a key-value pair may comprise a folder name (the key) and the memory address at which the folder indicated by the folder name is stored (the value).

Name service 104 may define a namespace for the DMOs in PMEM key-value store system 100. The namespace may be used to assign a name (a unique identifier) to each of the DMOs. Name service 104 may have a set of rules determining how DMOs are named and identified, which in one example, may include a requirement that the identifiers be unique and unambiguous. Name service 104 may enable a user to locate a DMO (or other resource) by providing the DMO name. In one example, name service 104 may comprise access control provisions, limiting the availability of directory information to authorized users.

Management node 102 may comprise key-value store manager 105. Key-value store manager 105 may maintain the global log of operations-performed within PMEM key-value store system 100. Key-value store manager 105 may manage key-value store creation requests, key-value store removal requests, and key-value-put requests such as by executing one or more steps of one or more of the methods depicted in flow diagram 400, flow diagram 500, and flow diagram 600. Key-value store manager 105 may comprise machine executable instructions, that, which executed by processor 107, may execute one or more steps of flow diagram 400, flow diagram 500, and flow diagram 600. Key-value store manager 105 may create entries in the global log corresponding to create-key-value store requests, remove-key-value store requests, and put-key-value requests. Key-value store manager 105 may update a status of one or more operations-performed entries in the global log responsive to receiving one or more messages from other nodes of PMEM key-value store system 100.

Each data node of the PMEM key-value store system 100 may comprise an object manager, such as object manager 114, object manager 124, and object manager 134. Each object manager is a single-node service that manages a DMO. The object manager is responsible for selecting (via a cluster manager 103) an initial object node group to contain the DMO and for assigning the chunk replicas within a node group. Some embodiments may contain additional object node groups. The object manager manages growing, shrinking, migrating, and recovering both the cluster of nodes that manage a DMO and the chunk replica assignments within that group, as required to meet the DMO's size and replication requirement, or to optimize its usage efficiency. The object manager may choose to move to another node (e.g., to be on the same node as a write client proxy). If the object manager node fails, the DMO's node group will re-elect an object owner. The object owner keeps track of client proxies and orchestrates all updates affecting the DMO, e.g., configuration changes as well as data writes (msync commits and/or write TO).

The object manager is used to handle operations on each object (DMO), which may include interacting with the name service 104, and requesting name service 104 to persist the corresponding DMO name and information via key-value store manager 105. Key-value store manager 105 may then organize the DMO name and information in key-value format, and persist the DMO name and information in key-value format within a key-value store implemented by PMEM key-value store system 100.

Each of data node 112, data node 122, and data node 132 may comprise a chunk service, such as chunk service 115, chunk service 125, and chunk service 135, respectively.

FIG. 2 shows an example embodiment of a key-value store architecture 200, in which a meta key-value store 201 may hierarchically organize a plurality of key-value stores within a single memory space, such as key-value store 203, by storing the root name and root address of each allocated key-value store within a single memory space/DAX. By storing each allocated key-value store name and key-value store root address within a meta key-value store, namespace conflicts may be avoided. As an example, upon a request to allocate a first key-value store name and a first key-value store root address for a new key-value store within a first memory space, a node may determine if the first key-value store name or the first key-value store root address are already allocated within the first memory space, by comparing the first key-value store name and the first key-value store root address against a plurality of key-value store names and key-value store root addresses stored as key-value pairs within meta key-value store 201. By maintaining a meta key-value store comprising a record of the currently allocated memory addresses within a memory space implemented in persistent memory, wherein the meta key-value store is itself maintained within the persistent memory, increased speed of various persistent memory operations may be enhanced as compared to systems and methods which rely upon recording the currently allocated memory addresses in a HDD or SSD.

Meta key-value store 201 comprises meta key-value store root 220, and header 222, which uniquely identifies meta key-value store 201, and indicates the PMEM address at which the meta key-value store root is located within DAX 280. Meta key-value store 201 may comprise a linked list of persisted rows, such as persisted row 230, and persisted row 232, wherein each persisted row may comprise a plurality of key-value slots. Each key-value slot may store a single key-value pair. Although only two persisted rows are shown for meta key-value store 201, it will be appreciated that the meta key-value store 201 may comprise substantially any positive integer number of persisted rows. In one example, each persisted row may contain up to a threshold number of key-value slots, and the key-value's within each slot may be organized according to number, or other organizational scheme, such that the key-value's within the meta key-value store are not in a random order, but are ordered according to a pre-determined scheme. Each persisted row may further comprise a next-pointer, such as next-pointer 260 and next-pointer 262, pointing to the PMEM address at which the next persisted row in the meta key-value store 201 is located. A last persisted row in meta key-value store 201 (persisted row 232 in the example shown in FIG. 2) may comprise a next-pointer pointing to NULL (such as Null 264 in meta key-value store 201), as no further persisted rows occur after a final persisted row.

The persisted rows of meta key-value store 201 may be used to rapidly and efficiently generate a memory tree in DRAM 205 from data stored in PMEM 208, such as meta key-value store memory tree 202 depicted in FIG. 2. Meta key-value store memory tree 202 comprises key-value store inner node 210, and key-value inner leaf node 212 and key-value inner leaf node 214. In one example, the meta key-value store memory tree 202 may comprise a B+ tree. Each persisted row in DAX 280 stored in PMEM 208 may be accessed by DRAM 205 to generate a key-value inner leaf node corresponding to the persisted row. For example, DRAM 205 may access persisted row 230 stored in PMEM 208 to generate key-value inner leaf node 212 in DRAM 205, and likewise DRAM 205 may access persisted row 232 stored in PMEM 208 to generate key-value inner leaf node 214.

As previously stated, each key-value slot within meta key-value store 201 may hold a root address and a name for another key-value store. Thus, each key-value slot within meta key-value store 201 may correspond to (and point to) a sub key-value store root address within PMEM. Thus, a meta key-value store may hierarchically organize a plurality of sub key-value stores, thereby enabling computationally efficient implementation of a plurality of key-value stores within a single DAX, which may be particularly advantageous with more complex data objects/data structures comprising a plurality of related key-value stores. As illustrated in FIG. 2, the last key-value slot in persisted row 230 of the meta key-value store 201 comprises (sub key-value store name, sub key-value store root address) 224, which uniquely indicates a PMEM address corresponding to a sub key-value store root and a sub key-value store name for sub key-value store 203.

Sub key-value store 203 comprises a linked list of persisted rows (persisted row 270 and persisted row 272) persisted within DAX 280 of PMEM 208. Sub key-value store root 250, and header 252 uniquely identify sub key-value store 203, and indicate the address in DAX 280 of PMEM 208 at which the sub key-value store root 250 is located. Persisted row 270, and persisted row 272 each comprise a plurality of key-value slots, wherein a single key-value pair (a key-value pair comprises a single key and a single value) may be stored in a single key-value slot. Although only two persisted rows are shown for sub key-value store 203, it will be appreciated that sub key-value store 203 may comprise substantially any positive integer number of persisted rows. In one example, each persisted row may contain up to a threshold number of key-value slots, and the key-value's within each slot may be organized according to number, or other organizational scheme, such that the key-value's, and persisted rows, within sub key-value store 203 are not in a random order, but are ordered according to a pre-determined scheme. Each persisted row may further comprise a next-pointer, such as next-pointer 290 and next-pointer 292, pointing to the PMEM address at which the next persisted row in the sub key-value store 203 is located. A last persisted row in sub key-value store 203 (persisted row 272 in the example shown in FIG. 2) may comprise a next-pointer pointing to NULL (such as Null 294 in sub key-value store 203), as no further persisted rows occur after a final persisted row.

The persisted rows of sub key-value store 203 may be used to rapidly and efficiently generate a memory tree in DRAM 205 from data stored in PMEM 208, such as sub key-value store memory tree 242 depicted in FIG. 2. Sub key-value store memory tree 242 comprises key-value inner node 244, key-value inner leaf node 246 and key-value inner leaf node 248. Sub key-value store memory tree 242, once generated from the persisted rows of sub key-value store 203, may enable rapid and computationally efficient query of values indexed by key within the key-value slots of sub key-value store 203. In one example, the sub key-value store memory tree 242 may comprise a B+ tree and, given a key, a value uniquely corresponding to the given key may be queried by comparing the given key against the nodes (inner nodes and eventually leaf node) of sub key-value store 203. In another example, the sub key-value store memory tree 242 may comprise a B memory tree. Each persisted row in DAX 280 stored in PMEM 208 may be accessed by DRAM 205 to generate a key-value inner leaf node corresponding to the persisted row. For example, DRAM 205 may access persisted row 270 stored in DAX 280 of PMEM 208 to generate key-value inner leaf node 246 in DRAM 205. Likewise, DRAM 205 may access persisted row 272 stored in DAX 280 of PMEM 208 to generate key-value inner leaf node 248.

Although shown in FIG. 2 as occurring within a same DAX (DAX 280), it will be appreciated that a meta key-value store may be persisted within PMEM of a first DAX (or multiple DAXs) while the sub key-value stores corresponding to the key-values within the meta key-value store may be persisted within persistent memory of a separate DAX (or DAXs). Further, the plurality of sub key-value stores corresponding to the key-values within the meta key-value store may each correspond to a unique DAX, or to a same DAX. In another example, a meta key-value store may comprise a first subset of key-values and a second subset of key-values, wherein the first subset of key-values corresponds to a first subset of key-value stores within a first DAX, and wherein the second subset of key-values corresponds to a second subset of key-value stores within a second DAX. In another example, a meta key-value store is included within each DAX, such that each DAX comprises a single meta key-value store for recording the root addresses and the names of each key-value store allocated within, or partially within, the associated DAX.

Turning now to FIG. 3, an example embodiment of a key-value store architecture 300 configured to distribute a single key-value store across multiple PMEM DAXs is shown. key-value store architecture 300 comprises key-value store 301, which is distributed amongst DAX 380, DAX 382, and DAX 384. Although three DAXs are shown in FIG. 3, it will be appreciated that the current disclosure provides for distributing a key-value store across any positive integer number of DAXs. Further, although in the embodiment shown in FIG. 3, a single persisted row is stored within a single DAX, such that persisted row 330, persisted row 332, and persisted row 334 are persisted within DAX 380, DAX 382, and DAX 384 respectively, it will be appreciated that the current disclosure provides for distributing the persisted rows of a key-value store amongst a plurality of DAXs in various fashions. In one example, a plurality of persisted rows of a key-value store may be distributed amongst a plurality of DAXs by allocating up to a threshold number of persisted rows for persistence within each of the plurality of DAXs. In another example, a plurality of persisted rows of a key-value store may be distributed amongst a plurality of DAXs by distributing persisted rows amongst available DAXs based on a latency reduction scheme. In another example, a plurality of persisted rows of a key-value store may be distributed amongst a plurality of DAXs based on a total persistent memory capacity of the various DAXs, such that DAXs with larger persistent memory capacities may persist a greater number of persisted rows, while DAXs with smaller persistent memory capacities may persist a smaller number of persisted rows. By distributing a single key-value store amongst a plurality of DAXs, a single key-value store's storage capacity may exceed the PMEM capacity of a single node, thereby enabling storage of large datasets in a low latency memory space.

key-value store 301 comprises a linked list of persisted rows, including persisted row 330, persisted row 332, and persisted row 334, persisted within DAX 380, DAX 382, and DAX 384, respectively. key-value store root 320, and header 322 uniquely identify key-value store 301, and indicate the address in DAX 380 of PMEM 308 at which the key-value store root 320 is located. Persisted row 330, persisted row 332, and persisted row 334 each comprise a plurality of key-value slots, wherein a single key-value pair may be stored/persisted in a single key-value slot. Although only three persisted rows are shown for key-value store 301, it will be appreciated that the disclosure provides for key-value stores comprising substantially any positive integer number of persisted rows. In one example, each persisted row may contain up to a threshold number of key-value slots, and the key-values within each slot may be organized according to number, or other organizational scheme, such that the key-values, and persisted rows, within key-value store 301 are not in a random order, but are ordered according to a pre-determined scheme, thereby enabling faster query with decreased latency. In another example, each persisted row may comprise greater than a threshold number of key-value slots. Each persisted row may further comprise a next-pointer, such as next-pointer 360, next pointer 362, and next-pointer 364, pointing to the PMEM address at which the next persisted row in the key-value store 301 is located. In the embodiment shown in FIG. 3, each next-pointer associated with a current persisted row, points to a PMEM address in a different memory space (DAX) than the memory space of the current persisted row. A last persisted row in key-value store 301 (persisted row 334 in the example shown in FIG. 3) may comprise a next-pointer pointing to NULL (such as Null 366 in sub key-value store 203), as no further persisted rows occur after a final persisted row.

The persisted rows of key-value store 301 may be used to rapidly and efficiently generate a memory tree in DRAM 305 from data stored in PMEM 308, such as key-value store memory tree 302 depicted in FIG. 3. key-value store memory tree 302 comprises key-value inner node 310, key-value inner leaf node 312, key-value inner leaf node 314, and key-value inner leaf node 316. key-value store memory tree 302, once generated from the persisted rows of key-value store 301, may enable rapid and computationally efficient query of values indexed by key within the key-value slots of key-value store 301. In one example, the key-value store memory tree 302 may comprise a B+ tree and, given a key, a value uniquely corresponding to the given key may be queried by comparing the given key against the nodes (key-value inner nodes and eventually a key-value leaf node) of sub key-value store 301. In another example, the key-value store memory tree 302 may comprise a B tree. Each persisted row of key-value store 301 stored in PMEM 308 may be accessed by DRAM 305 to generate a key-value inner leaf node corresponding to the persisted row. For example, DRAM 305 may access persisted row 330 stored/persisted in DAX 380 to generate key-value inner leaf node 312 in DRAM 305. Likewise, DRAM 305 may access persisted row 332 stored/persisted in DAX 382 and persisted row 334 stored/persisted in DAX 384 to generate key-value inner leaf node 314 and key-value inner leaf node 316, respectively.

Turning now to FIG. 4, an example flow diagram 400 for creating a new key-value store is shown. Flow diagram 400 illustrates the communication/data transfer between DAXs within a PMEM key-value store system which may occur as part of a new key-value store creation process/method. Flow diagram 400 may be executed by a PMEM key-value store system, such as PMEM key-value store system 100, based on machine executable instructions to create a new key-value store within a memory space. Flow diagram 400 may be executed in response to a new key-value store request, which in one example, may comprise a request ID, an indication of a memory space where the new key-value store root address is to be allocated, as well as a key-value store name. Flow diagram 400 comprises, creating a first create-key-value-store operation-performed entry in a global log persisted within a first memory space (DAX with global log 402); allocating a first key-value store name and a first key-value store root address within a second memory space (DAX-N 404); persisting the first key-value store name and the first key-value store root address within a first local log of the second memory space (DAX-N 404); updating the global log of the first memory space to include the first key-value store name and the first key-value store root address (DAX with global log 402); and adding the first key-value store name and the first key-value store root address to a meta key-value store (DAX with meta key-value store 406). Flow diagram 400 may enable creation of multiple key-value stores within a single DAX while avoiding namespace conflicts by recording each allocated key-value store root address and key-value store name within a memory space, thereby providing a computational efficient way to query which addresses within a memory space are allocated, and which are unallocated.

Flow diagram 400 begins at 420 which may include creating and persisting a create-key-value store operation-performed entry in a global log at DAX with the global log 402. In one example, DAX with the global log 402 may be implemented by a management node. The create-key-value store operation-performed entry may comprise a status (also referred to herein as a completion status) which may be set to one or more pre-defined values, corresponding to a degree of completion. As an example, at 420, an initial status of the create-key-value store operation-performed may be set to the string "INIT" or "initialized" indicating a first degree of completion of the create-key-value store operation-performed. In another example, a status of the create-key-value store operation-performed may comprise a numerical value, uniquely corresponding to a degree of completion of the create-key-value store operation performed. The create-key-value store operation-performed status may enable more efficient failure recovery. As an example, in the event of power failure at 420 of all or part of the PMEM key-value store system implementing flow diagram 400, execution of the create-key-value store operation-performed (task) may cease, however, as the global log is persisted in PMEM, the create-key-value store operation-performed status remains even in the absence of power. Upon resuming powered operation, the PMEM key-value store system may evaluate the global log to determine if any tasks (operations) were pre-maturely terminated because of the power failure (that is, terminated before completion), and based on the status of the various operations-performed (tasks) within the global log, the PMEM key-value store system may resume execution of incomplete operations (tasks). As a specific example, upon resuming powered operation, the PMEM key-value store system executing flow diagram 400 may determine that a current state of the create-key-value store operation-performed is at the initialization stage, and may therefore resume execution of flow diagram 400 from step 420. In one example, in addition to the status, the create-key-value store operation-performed entry may comprise a transition ID, and an ID/address uniquely identifying the DAX in which the key-value store root address and key-value store name are to be allocated (DAX-N 404 in the example of FIG. 4), and a request ID corresponding to the new key-value store request which initiated flow diagram 400. The transition ID may comprise a number uniquely identifying the entry in the global log. In one example, the transition ID may comprise a global, monotonically increasing value, such that each entry in the global lob comprises a transition ID larger than the immediately preceding entry.

Following step 420, flow diagram 400 may include DAX with global log 402 transmitting a message to DAX-N 404, wherein the message comprises a request for DAX-N 404 to allocate a key-value store root address and a corresponding key-value store name.

At step 422, flow diagram 400 may include DAX-N 404 allocating a key-value store name and a key-value store root address, and persisting the allocated key-value store name and key-value store root address in a local log of DAX-N 404. In one example, allocating the key-value store name and the key-value store root address may comprise evaluating a subset of key-value pairs persisted within a meta key-value store associated with DAX-N 404, determining an unallocated address within PMEM of DAX-N 404, and allocating the unallocated address for the key-value store root of the new key-value store. Step 422 may further comprise DAX-N 404 persisting the allocated key-value store name, the allocated key-value store root address, and a transition ID in a local log. The transition ID persisted within the local log may match the transition ID in the global log, thereby enabling correlation between the entry in the global log and the entry in the local log. As an example, the transition ID in the global log and the transition ID persisted in the local log may comprise the same number.

In one example, by persisting the allocated key-value store name and the allocated key-value store root address in a local log, an efficiency of a failure recovery process may be increased by enabling a pre-failure state of a PMEM key-value store system to be recovered, and to enable interrupted tasks to be resumed based on the contents of the global log, and further based on the contents of one or more local logs. As a specific example, based on a status of a create-key-value store operation-performed being set to "INIT", and further based on a DAX ID/address corresponding to DAX-N 404 included within the create-key-value store operation-performed entry, it may be determined if a key-value store root address and key-value store name have been allocated within DAX-N 404 by evaluating the local log persisted within DAX-N 404. In this way, it may be determined during failure recovery if the create-key-value store operation-performed is to proceed from step 422 or from step 424.

Following step 422, flow diagram 400 may include DAX-N 404 transmitting a message to DAX with global log 402, wherein the message may comprise the allocated key-value store root address and the allocated key-value store name.

At step 424, flow diagram 400 may include DAX with global log 402 updating the create-key-value store operation-performed entry in the global log to include the allocated key-value store root address and the allocated key-value store name. Step 424 may further include updating the create-key-value operation-performed status to indicate that the key-value store root address has been allocated. In one example, step 424 may include setting a status of the create-key-value operation-performed entry to "ROOT_ALLOC." In one example, updating the status of the create-key-value operation-performed entry in the global log may enable continuation of a process of creating a new key-value store from step 424, thereby reducing redundant computations/PMEM allocations and further reducing a probability of a task failing to complete.

Following step 424, flow diagram 400 may include transmitting a message from DAX with global log 402 to DAX-N 404, wherein the message may comprise an indication that the allocated key-value store root address and the allocated key-value store name have been recorded/persisted in the global log. Flow diagram 400 may then proceed to step 426.

At step 426, method 400 may comprise cleaning up and committing the local log of DAX-N 404. In one example cleaning up the local log comprises moving the active log position in DAX-N 404.

Following step 426, flow diagram 400 may include transmitting a message from DAX-N 404 to DAX with global log 402, wherein the message indicates that the local log of DAX-N 404 has been cleaned and committed. Flow diagram 400 may then proceed to step 428.

At step 428, flow diagram 400 may comprise updating the status of the create-key-value store operation-performed in the global log to indicate that the key-value store root is ready, and that key-values may now be stored within the new key-value store. In one example, step 428 may comprise setting a status of the create-key-value store operation-performed in the global log to "ROOT_READY."

Following step 428, DAX with global log 402 may transmit a message to DAX with meta key-value store 406, wherein the message may comprise the allocated key-value store root address and the allocated key-value store name. Flow diagram 400 may then proceed to step 430.

At step 430, flow diagram 400 may comprise persisting the allocated key-value store name and the allocated key-value store root address as a key-value pair within the meta key-value store persisted within DAX with meta key-value store 406.

Following step 430, flow diagram 400 may comprise DAX with meta key-value store 406 transmitting a message to DAX with global log 402, wherein the message may comprise an indication that the allocated key-value store root address and the allocated key-value store name, have been successfully added to the meta key-value store. Flow diagram 400 may then proceed to step 432.

At step 432, flow diagram 400 may comprise cleaning up and committing the create-key-value store operation-performed entry in the global log. Each entry in the global log may be persisted as a map, and in one example, each log entry may be persisted in a key-value store. Cleaning up and committing the create key-value store operation-performed may comprise erasing the outdated information, such as a previous status, in the map. Flow diagram 400 may then end.

In this way, the method depicted in flow diagram 400 may enable computationally efficient creation of a new key-value store such that multiple key-value stores may be persisted within a single DAX, by persisting allocated key-value store root addresses and allocated key-value store names of a first DAX (also referred to herein as a memory space) within a meta key-value store. The method depicted in flow diagram 400 may further enable more efficient failure recovery, as a task may be resumed from a previous point of completion by evaluating the status of the task stored within the global log, and further by correlating the status of the task in the global log with a local log of one or more DAXs.

Turning to FIG. 5, an example flow diagram 500 for adding a key-value pair to a key-value store implemented in PMEM is shown. Flow diagram 500 illustrates the communication/data transfer between DAXs within a PMEM key-value store system which may occur as part of a key-value pair insertion process/method. Specifically, flow diagram 500 illustrates communication between DAX with global log 502, DAX with split key-value leaf 504, and DAX-N 506. Flow diagram 500 may be executed by a PMEM key-value store system, such as PMEM key-value store system 100, based on machine executable instructions to add a key-value pair to a key-value store, wherein the key-value store may be distributed amongst a plurality of memory spaces, and wherein the plurality of memory spaces may comprise PMEM.

Flow diagram 500 may be executed by a PMEM key-value store system in response to a put-key-value request. In one example, a put-key-value request may be generated by a user and may comprise a key-value pair to be inserted, a request ID uniquely identifying the put-key-value request, a key-value store root address and/or a key-value store name (corresponding to the key-value store in which the key-value pair is to be inserted).

Flow diagram 500 comprises, creating a put-key-value operation-performed entry in the global log persisted within a first memory space, allocating a persisted row within a second memory space, storing a persisted row address corresponding to the allocated persisted row within a local log of the second memory space, updating the put-key-value operation-performed entry in the global log with the address the persisted row, setting a next-pointer within a previous persisted row of the key-value store in a third memory space to the address of the allocated persisted row, persisting a second key-value pair from the previous persisted row within the allocated persisted row in the second memory space, removing the second key-value pair from the previous persisted row, inserting the first key-value pair into the previous persisted row, and updating a status of the put-key-value operation-performed entry in the global log to indicate successful insertion of the first key-value pair into the key-value store. In this way, flow diagram 500 may enable insertion/addition of a key-value pair into a key-value store distributed across a plurality of memory spaces, thereby increasing a storage capacity of a single key-value store. Further, by updating a status of a put-key-value operation-performed entry in a global log to reflect a degree of a completion of the put-key-value operation, in the event of power failure, the put-key-value operation may be resumed from a previous point of completion, thereby reducing a probability of a put-key-value operation remaining incomplete.

Flow diagram 500 begins at step 520, which may include DAX with global log 502 creating and persisting a put-key-value operation-performed (OP) entry in a global log. In one example, step 502 may include setting a status of the put-key-value OP entry to "INIT" and adding a transition ID, and request info into the put-key-value OP entry.

Following step 520, DAX with global log 502 may transmit a message to DAX-N 506, wherein the message may comprise a request to allocate a new persisted row. In one example, the request may comprise a next-pointer, indicating a PMEM address. Flow diagram 500 may then proceed to step 522.

At step 522, flow diagram 500 may include DAX-N 506 allocating a persisted row based on the next-pointer included in the message from DAX with global log 502. Step 522 may further comprise DAX-N 506 persisting the allocated address of the persisted row in a local log of DAX-N 506.

Following step 522, flow diagram 500 may include DAX-N 506 transmitting a message to DAX with global log 502, wherein the message may comprise the address of the allocated persisted row. Method 500 may then proceed to 524.

At step 524, method 500 may include DAX with the global log 502 updating the put-key-value OP entry to include the address of the allocated persisted row. Step 524 may further include DAX with global log 502 updating the put-key-value OP entry status to "KVLEAF_ALLOC".

Following step 524, flow diagram 500 may include DAX with global log 502 transmitting a message to DAX-N 506, wherein the message may comprise a request to clean up and commit the local log. Method 500 may then proceed to 526.

At step 526, method 500 may include DAX-N 506 cleaning up and committing the local log.

Following step 526, flow diagram 500 may include DAX-N 506 transmitting a message to DAX with global log 502, wherein the message may comprise an indication that the local log of DAX-N 506 has been cleaned and committed. Method 500 may then proceed to 528.

At step 528, method 500 may include DAX with global log 502 updating the status of the put-key-value OP entry in the global log "KVLEAF_COMMIT."

Following step 528, flow diagram 500 may include DAX with global log 502 transmitting a message to DAX with split key-value leaf 504, wherein the message may comprise the address of the allocated persisted row in DAX-N 506. Method 500 may then proceed to 530.

At step 530, method 500 may include DAX with split key-value leaf 504 updating a next-pointer of the previous persisted row to the allocated persisted row address.

Following step 530, DAX with split key-value leaf 504 may transmit a message to DAX with global log 502, wherein the message may comprise an indication that the next-pointer of the previous persisted row has been updated, and which may further comprise one or more key-value pairs from the previous persisted row. Flow diagram 500 may then proceed to 532.

At step 532, method 500 may include DAX with global log 502 updating the status of the put-key-value OP entry in the global log to "KVLEAF_COPY" and persisting in the global log the one or more key-value pairs of the previous persisted row to be copied into the allocated persisted row.

Following step 532, flow diagram 500 may comprise DAX with global log 502 transmitting a message to DAX-N 506, wherein the message may comprise the one or more key-value pairs of the previous persisted row to be copied into the allocated persisted row. Flow diagram 500 may then proceed to step 534.

At step 534, method 500 may include DAX-N 506 persisting the one or more key-value pairs of the previous persisted row in the allocated persisted row.

Following step 534, flow diagram 500 may comprise DAX-N 506 transmitting a message to DAX with global log 502, wherein the message may comprise confirmation that the one or more key-value pairs of the previous persisted row have been persisted within the allocated persisted row of DAX-N 506. DAX with global log 502 may then, in response to the confirmation, transmit a message to DAX with split key-value leaf 504 indicating that the one or more pairs of the previous persisted row have been copied into the allocated persisted row of DAX-N 506. Flow diagram 500 may then proceed to step 536.

At step 536, method 500 may include DAX with the split key-value leaf 504 removing the one or more key-value pairs of the previous persisted row from the previous persisted row.

Following step 536 DAX with split key-value leaf 504 may transmit a message to DAX with global log 502, wherein the message may comprise confirmation that the one or more key-value pairs of the previous persisted row have been removed. Flow diagram 500 may then proceed to step 538.

At step 538, method 500 may include DAX with global log 502 updating the status of the put-key-value OP entry to "KVLEAF_READY."

Following step 538, flow diagram 500 may include DAX with global log 502 transmitting a message to DAX with split key-value leaf 504, wherein the message may include the new key-value pair to be inserted into the key-value store corresponding to the previous persisted row.

At step 540, flow diagram 500 may include DAX with split key-value leaf 504 inserting the new key-value pair into the previous persisted row.

Following step 540, flow diagram 500 may include DAX with split key-value leaf 504 transmitting a message to DAX with global log 502, wherein the message may comprise a confirmation that the new key-value pair has been successfully inserted into the previous persisted row.

At step 542, method 500 may include DAX with global log 502 cleaning up and committing the put-key-value OP entry in the global log. Flow diagram 500 may then end.

In this way, flow diagram 500 may enable insertion/addition of a key-value pair into a key-value store distributed across a plurality of memory spaces (DAXs), thereby increasing a storage capacity of a single key-value store. Further, by updating a status of a put-key-value operation-performed entry in a global log to reflect a degree of a completion of the put-key-value operation, in the event of power failure, the put-key-value operation may be resumed from a previous point of completion, thereby reducing a probability of a put-key-value operation remaining incomplete.

Turning to FIG. 6, an example flow diagram 600 for removing a key-value store from PMEM is shown. Flow diagram 600 illustrates the communication/data transfer between DAXs within a PMEM key-value store system which may occur as part of a key-value store removal process/method. Flow diagram 600 may be executed by a PMEM key-value store system, such as PMEM key-value store system 100, based on machine executable instructions to remove a pre-existing key-value store from within a memory space. Flow diagram 600 may be executed in response to a remove key-value store request. In one example, a remove key-value store request may be initiated by a user and may comprise a request ID, a key-value store root address and key-value store name (of the key-value store to be removed). In one example, a remove key-value store request may be generated in response to a user deleting a directory corresponding to the key-value store, wherein the remove key-value store request may comprise the key-value store root address and key-value store name.

Flow diagram 600 comprises, creating a remove-key-value-store operation-performed entry in the global log persisted within the first memory space in response to a remove-key-value store request, freeing the first key-value store name and the first key-value store root address within the second memory space in response to the remove-key-value-store operation-performed entry in the global log, updating the first local log to indicate that the first key-value store name and the first key-value store root address are freed, updating the remove-key-value-store operation-performed entry in the global log to indicate that the first key-value store name and the first key-value store root address are freed, and removing the first key-value store name and the first key-value store root address from the meta key-value store. Flow diagram 600 may enable removal of key-value stores from PMEM, which may be distributed amongst multiple DAXs, while maintaining a status of the removal process in a global log within a separate DAX from the key-value store to be removed. By maintaining a status of the remove-key-value operation-performed, a probability of the task failing to execute may be reduced, and coordination of multiple separate DAXs may be more efficiently conducted. Further, by updating a meta key-value store indicate removal of the key-value store root address and key-value store name, more efficient memory allocation may be enabled, as an up to date record of allocated and unallocated addresses within a PMEM memory space may be maintained.

Flow diagram 600 begins at 620 which may include creating and persisting a remove-key-value store operation-performed entry in a global log at DAX with the global log 602. In one example, DAX with the global log 602 may be implemented by a management node. In another example, DAX with the global log 602 may be implemented by one or more data nodes. The remove-key-value store operation-performed entry may comprise a status (also referred to herein as a completion status) which may be set to one or more pre-defined values, corresponding to a degree of completion. As an example, at 620, an initial status of the remove-key-value store operation-performed may be set to the string "INIT" or "initialized" indicating a first degree of completion of the remove-key-value store operation-performed. In another example, a status of the remove-key-value store operation-performed may comprise a numerical value, uniquely corresponding to a degree of completion of the remove-key-value store operation performed. The remove-key-value store operation-performed status may enable more efficient failure recovery of the PMEM key-value store, which may reduce a probability of a task (wherein a task may comprise a remove-key-value store request) failing to complete. As an example, in the event of power failure after step 620 and before step 622, execution of the remove-key-value store operation-performed (a task) may cease, however, as the global log is persisted in PMEM, the remove-key-value store operation-performed status persists within the global log even in the absence of power. Upon resuming powered operation, the PMEM key-value store system may evaluate the global log to determine if any tasks (operations) were not completed because of the power failure, and based on the status of the various operation statuses (task statuses) within the global log, the PMEM key-value store system may resume execution of incomplete operations (tasks). As a specific example, upon resuming powered operation, the PMEM key-value store system executing flow diagram 600 may determine that a current state of the remove-key-value store operation-performed is at the initialization stage (as indicated by the status being set to "INIT"), and may therefore resume execution of flow diagram 600 from step 622. In one example, in addition to the status, the remove-key-value store operation-performed entry may comprise a transition ID, and the key-value store root address and key-value store name of the key-value store to be removed (DAX with user key-value store 604 in the example of FIG. 6), and a request ID corresponding to the remove key-value store request which initiated flow diagram 600. In one example, the transition ID may comprise a global monotonically increasing value, wherein each entry in the global log corresponds to a unique value, wherein earlier entries correspond to lower values relative to the values corresponding to later entries.

Following step 620, flow diagram 600 may include DAX with global log 602 transmitting a message to DAX with user key-value store 604, wherein the message comprises a request for DAX with user key-value store 604 to free the key-value store root address and the corresponding key-value store name included in the remove key-value store request.

At step 622, flow diagram 600 may include DAX with user key-value store 604 freeing/unallocating the key-value store name and the key-value store root address, and updating a local log of DAX with user key-value store 604 to indicate that the key-value store root address and the key-value store name have been freed. In one example, updating a local log of DAX with user key-value store 604 to indicate that the key-value store root address and the key-value store name have been freed may include persisting a "ROOT_FREE" flag with a transition ID in the local log. In one example, the transition ID included in the local log matches the transition ID included in the global log, thereby enabling correlation between the entry in the local log and the entry global log.

In one example, by updating the local log to include the "ROOT FREED" flag along with a corresponding transition ID uniquely indicating the corresponding remove-key-value operation-performed entry in the global log, an efficiency of a failure recovery process may be increased by enabling a pre-failure state of a PMEM key-value store system to be recovered, and to enable interrupted tasks to be resumed from a previous point of completion based on the contents of the global log, and further based on the contents of one or more local logs. As a specific example, based on a status of a remove-key-value store operation-performed being set to "INIT", and further based on the key-value store root address and the key-value store name included within the remove-key-value store operation-performed entry, it may be determined if a key-value store root address and key-value store name have been freed within DAX with user key-value store 604 by evaluating the local log persisted within DAX with user key-value store 604. In this way, it may be determined during failure recovery if the remove-key-value store operation-performed is to proceed from step 622 or from step 624.

Following step 622, flow diagram 600 may include DAX with user key-value store 604 transmitting a message to DAX with global log 602, wherein the message may comprise an indication that the key-value store root address and the key-value store name, corresponding to the key-value store to be removed, have been freed. In one example, the message may include "ROOT_FREE". Flow diagram 600 may then proceed to step 624.

At step 624, flow diagram 600 may include DAX with global log 602 updating the status of the remove-key-value store operation-performed entry in the global log to indicate that the requested key-value store root address and key-value store name have been freed. In one example, indicating that the requested key-value store root address and key-value store name have been freed may include setting the status to "ROOT_FREE". In one example, updating the status of the create-key-value operation-performed entry in the global log may enable continuation of the process of removing the key-value store from step 626, thereby reducing redundant computations/PMEM allocations and further reducing a probability of a task failing to complete.

Following step 624, flow diagram 600 may include transmitting a message from DAX with global log 602 to DAX with user key-value store 604, wherein the message may comprise an indication that the status of the remove-key-value store operation-performed persisted in the global log has been updated to indicate freeing of the key-value store root address and the key-value store name. Flow diagram 600 may then proceed to step 626.

At step 626, method 600 may comprise cleaning up and committing the local log of DAX with user key-value store 604. In one example, cleaning up the local log may comprise deleting outdated entries within the local log and moving the active log position in the log device.

Following step 626, flow diagram 600 may include transmitting a message from DAX with user key-value store 604 to DAX with global log 602, wherein the message may indicate that the local log of DAX with user key-value store 604 has been cleaned and committed. Flow diagram 600 may then proceed to step 628.

At step 628, flow diagram 600 may comprise updating the status of the remove-key-value store operation-performed in the global log to indicate that the key-value store root is ready, and that key-values may now be stored within the new key-value store. In one example, step 628 may comprise setting a status of the create-key-value store operation-performed in the global log to "ROOT_COMMIT."

Following step 628, DAX with global log 602 may transmit a message to DAX with meta key-value store 606, wherein the message may comprise the freed key-value store root address and the freed key-value store name, along with a request to remove the freed key-value store root address and the freed key-value store name from the meta key-value store. Flow diagram 600 may then proceed to step 630.

At step 630, flow diagram 600 may comprise removing the freed key-value store name and the freed key-value store root address from within the meta key-value store persisted within DAX with meta key-value store 606.

Following step 630, flow diagram 600 may comprise DAX with meta key-value store 606 transmitting a message to DAX with global log 602, wherein the message may comprise an indication that the freed key-value store root address and the freed key-value store name, have been successfully removed from the meta key-value store. Flow diagram 600 may then proceed to step 632.

At step 632, flow diagram 600 may comprise cleaning up and committing the create-key-value store operation performed entry in the global log. Flow diagram 600 may then end.

In this way, the method depicted in flow diagram 600 may enable computationally efficient removal of a key-value store persisted within a DAX. The method depicted in flow diagram 600 may further enable more efficient failure recovery, as a task may be resumed from a previous point of completion by evaluating the status of the task stored within the global log, and further by correlating the status of the task in the global log with a local log of one or more DAXs.

The disclosure also provides support for a method comprising: creating a first create-key-value-store operation-performed entry in a global log persisted within a first memory space; allocating a first key-value store name and a first key-value store root address within a second memory space; persisting the first key-value store name and the first key-value store root address within a first local log of the second memory space; updating the global log of the first memory space to include the first key-value store name and the first key-value store root address; and adding the first key-value store name and the first key-value store root address to a meta key-value store. In a first example of the method, wherein the first memory space comprises a first direct access (DAX) memory space, and wherein the second memory space comprises a second DAX memory space. In a second example of the method, optionally including the first example, wherein the first DAX memory space comprises at least a first persistent memory device, and wherein the second DAX memory space comprises at least a second persistent memory device. In a third example of the method, optionally including the first and second examples, the method further comprising: creating a second create-key-value-store operation-performed entry in the global log persisted within the first memory space; allocating a second key-value store name and a second key-value store root address within the second memory space; persisting the second key-value store name and the second key-value store root address within the first local log of the second memory space; updating the global log of the first memory space to include the second key-value store name and the second key-value store root address; and adding the second key-value store name and the second key-value store root address to the meta key-value store. In a fourth example of the method, optionally including the first through third examples, the method further comprising: creating a remove-key-value-store operation-performed entry in the global log persisted within the first memory space in response to a remove-key-value store request; freeing the first key-value store name and the first key-value store root address within the second memory space in response to the remove-key-value-store operation-performed entry in the global log; updating the first local log to indicate that the first key-value store name and the first key-value store root address are freed; updating the remove-key-value-store operation-performed entry in the global log to indicate that the first key-value store name and the first key-value store root address are freed; and removing the first key-value store name and the first key-value store root address from the meta key-value store. In a fifth example of the method, optionally including the first through fourth examples, wherein the first create-key-value-store operation-performed entry in the global log comprises a status, wherein the status indicates a current state of completion of the create-key-value-store operation-performed. In a sixth example of the method, optionally including the first through fifth examples, wherein creating the first create-key-value-store operation-performed entry in the global log persisted within the first memory space further comprises setting the status of the first create-key-value-store operation-performed entry to indicate creation of a first key-value store is initialized. In a seventh example of the method, optionally including the first through sixth examples, wherein updating the global log of the first memory space to include the first key-value store name and the first key-value store root address further comprises setting the status of the first create-key-value-store operation-performed entry to indicate the first key-value store name and first key-value store root address are allocated. In an eighth example of the method, optionally including the first through seventh examples, the method further comprising: responsive to a request to insert a first key-value pair within a key-value store, wherein the key-value store is uniquely identified by the first key-value store name and the first key-value store root address: creating a put-key-value operation-performed entry in the global log persisted within the first memory space; allocating a key-value leaf within a third memory space; storing a key-value leaf address corresponding to the allocated key-value leaf within a second local log of the third memory space; updating the put-key-value operation-performed entry in the global log with the key-value leaf address of the allocated key-value leaf; setting a key-value leaf next-pointer within a previous key-value leaf of the key-value store to the key-value leaf address of the allocated key-value leaf; persisting a second key-value pair from the previous key-value leaf within the allocated key-value leaf in the third memory space; removing the second key-value pair from the previous key-value leaf; inserting the first key-value pair into the previous key-value leaf; and updating a status of the put-key-value operation-performed entry in the global log to indicate successful insertion of the first key-value pair into the key-value store.

The disclosure also provides support for a persistent memory key-value store system comprising: a plurality of data nodes, wherein each of the plurality of data nodes comprises a persistent memory device, a processor, and a network interface to send and receive messages and data, wherein the network interface operates on remote direct memory access; a first memory space persisting a global log; a second memory space persisting a meta key-value store; and a third memory space persisting a first key-value store and a second key-value store. In a first example of the system, wherein the first memory space, the second memory space, and the third memory space, each comprise at least one of persistent memory or DRAM cache. In a second example of the system, optionally including the first example, wherein the meta key-value store comprises at least: a first key-value pair, wherein the first key-value pair comprises a first key-value store name and a first key-value store root address corresponding to the first key-value store in the third memory space; and a second key-value pair, wherein the second key-value pair comprises a second key-value store name and a second key-value store root address corresponding to the second key-value store in the third memory space. In a third example of the system, optionally including the first and second examples, wherein the global log comprises a plurality of operation-performed entries, wherein each operation-performed entry indicates an operation and a status of the operation. In a fourth example of the system, optionally including the first through third examples, wherein the plurality of operation-performed entries comprise one or more of the group of a create-key-value store entry, a remove-key-value store entry, and a put-key-value entry.

The disclosure also provides support for a persistent memory key-value store system comprising: a plurality of nodes, wherein each of the plurality of nodes comprise a persistent memory device, a processor, and a network interface to send and receive messages and data, wherein the network interface operates on remote direct memory access; a first memory space comprising a global log of operations-performed within the system; a second memory space comprising a meta key-value store, wherein the meta key-value store comprises a plurality of key-value pairs comprising a plurality of key-value store names and key-value store root addresses; a third memory space comprising a local log; and machine executable instructions executable by the persistent key-value store system to: generate a new key-value store request; responsive to the new key-value store request: create a first create-key-value-store operation-performed entry in the global log; allocate a key-value store name and a key-value store root address within the third memory space; persist the key-value store name and the key-value store root address within the local log of the third memory space; update the global log to include the first key-value store name and the first key-value store root address; and add the key-value store name and the key-value store root address as a key-value pair to the meta key-value store. In a first example of the system, wherein the machine executable instructions are further executable to: compare the key-value store name and the key-value store root address against the plurality of key-value store names and the plurality of key-value store root addresses within the meta key-value store; and responsive to the key-value store name being included within the plurality of key-value store names or the key-value store root address being included within the plurality of key-value store root addresses, not allocating the key-value store name and the key-value store root address. In a second example of the system, optionally including the first example, wherein the machine executable instructions are further executable to: generate a put-key-value request, wherein the put-key-value request comprises at least a key-value and the key-value store root address; responsive to the put-key-value request: create a put-key-value operation-performed entry in the global log; allocate a key-value leaf within the third memory space and record the allocated key-value leaf address within the local log; update the put key-value operation-performed entry in the global log to indicate the allocated key-value leaf address; persist the key-value in the allocated key-value leaf; and update the put-key-value operation-performed entry in the global log to indicate satisfaction of the put-key-value request. In a third example of the system, optionally including the first and second examples, wherein the key-value is persisted in a persisted row, stored within persistent memory of the third memory space. In a fourth example of the system, optionally including the first through third examples, wherein the machine executable instructions are further executable to: generate a remove-key-value store request, wherein the remove-key-value store request comprises at least the key-value store root address; responsive to the remove-key-value store request: create a remove-key-value store operation-performed entry in the global log; free the key-value store name and the key-value store root address within the third memory space and update the local log to indicate that the key-value store name and the key-value store root address are freed; update the remove-key-value-store operation-performed entry in the global log to indicate that the key-value store name and the key-value store root address are freed; and remove the first key-value store name and the first key-value store root address from the meta key-value store.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one Application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuits forming a communications device. (e.g., a modem, communications switch, or the like)

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method comprising:
creating a first create-key-value-store operation-performed entry in a global log persisted within a first memory space;
allocating a first key-value store name and a first key-value store root address within a second memory space;
persisting the first key-value store name and the first key-value store root address within a first local log of the second memory space;
updating the global log of the first memory space to include the first key-value store name and the first key-value store root address; and
adding the first key-value store name and the first key-value store root address to a meta key-value store;
creating a remove-key-value-store operation-performed entry in the global log persisted within the first memory space in response to a remove-key-value store request;
freeing the first key-value store name and the first key-value store root address within the second memory space in response to the remove-key-value-store operation-performed entry in the global log;
updating the first local log to indicate that the first key-value store name and the first key-value store root address are freed;
updating the remove-key-value-store operation-performed entry in the global log to indicate that the first key-value store name and the first key-value store root address are freed; and
removing the first key-value store name and the first key-value store root address from the meta key-value store.

2. The method of claim 1, wherein the first memory space comprises a first direct access (DAX) memory space, and wherein the second memory space comprises a second DAX memory space.

3. The method of claim 2, wherein the first DAX memory space comprises a first distributed memory space implemented by at least a first persistent memory device, and wherein the second DAX memory space comprises a second distributed memory space implemented by at least a second persistent memory device.

4. The method of claim 1, the method further comprising:
creating a second create-key-value-store operation-performed entry in the global log persisted within the first memory space;
allocating a second key-value store name and a second key-value store root address within the second memory space;
persisting the second key-value store name and the second key-value store root address within the first local log of the second memory space;
updating the global log of the first memory space to include the second key-value store name and the second key-value store root address; and
adding the second key-value store name and the second key-value store root address to the meta key-value store.

5. The method of claim 1, wherein the first create-key-value-store operation-performed entry in the global log comprises a status, wherein the status indicates a degree of completion of the create-key-value-store operation-performed.

6. The method of claim 5, wherein creating the first create-key-value-store operation-performed entry in the global log persisted within the first memory space further comprises setting the status of the first create-key-value-store operation-performed entry to indicate creation of a first key-value store is initialized, and wherein the first create-key-value-store operation-performed entry in the global log includes a transition ID uniquely identifying the create-key-value-store operation-performed.

7. The method of claim 5, wherein updating the global log of the first memory space to include the first key-value store name and the first key-value store root address further comprises setting the status of the first create-key-value store operation-performed entry to indicate the first key-value store name and first key-value store root address are allocated.

8. The method of claim 1, the method further comprising:
responsive to a request to insert a first key-value pair within a key-value store, wherein the key-value store is uniquely identified by the first key-value store name and the first key-value store root address:
creating a put-key-value operation-performed entry in the global log persisted within the first memory space;
allocating a persisted row within a third memory space;
storing a persisted row address corresponding to the allocated persisted row within a second local log of the third memory space;
updating the put-key-value operation-performed entry in the global log with the persisted row address of the allocated persisted row;
setting a next-pointer within a previous persisted row of the key-value store to the persisted row address of the allocated persisted row;
persisting a second key-value pair from the previous persisted row within the allocated persisted row in the third memory space;
removing the second key-value pair from the previous persisted row;
inserting the first key-value pair into the previous persisted row; and
updating a status of the put-key-value operation-performed entry in the global log to indicate successful insertion of the first key-value pair into the key-value store.

9. The method of claim 1, wherein the global log persisted within a first memory space comprises a key-value store persisted within persistent memory of the first memory space.

10. A persistent memory key-value store system comprising:
a plurality of nodes, wherein the plurality of nodes comprise a plurality of persistent memory devices, a processor, and a network interface to send and receive messages and data, wherein the network interface operates on remote direct memory access;

a first memory space implemented by the plurality of nodes, wherein the first memory space comprises a global log of operations-performed within the persistent memory key-value store system;

a second memory space implemented by the plurality of nodes, wherein the second memory space comprises a meta key-value store, wherein the meta key-value store comprises a plurality of key-value pairs comprising a plurality of key-value store names and key-value store root addresses;

a third memory space implemented by the plurality of nodes, wherein the third memory space comprises a local log; and machine executable instructions executable by the persistent key-value store system to:

generate a new key-value store request;

respond to the new key-value store request by:
- creating a first create-key-value-store operation-performed entry in the global log;
- allocating a key-value store name and a key-value store root address within the third memory space;
- persisting the key-value store name and the key-value store root address within the local log of the third memory space;
- updating the global log to include the first key-value store name and the first key-value store root address; and
- adding the key-value store name and the key-value store root address as a key-value pair to the meta key-value store.

11. The system of claim 10, wherein the machine executable instructions are further executable to:

compare the key-value store name and the key-value store root address against the plurality of key-value store names and the plurality of key-value store root addresses within the meta key-value store; and respond to the key-value store name being included within the plurality of key-value store names or the key-value store root address being included within the plurality of key-value store root addresses, by not allocating the key-value store name and the key-value store root address.

12. The system of claim 10, wherein the machine executable instructions are further executable to:

generate a put-key-value request, wherein the put-key-value request comprises at least a key-value and the key-value store root address;

responsive to the put-key-value request:
- create a put-key-value operation-performed entry in the global log;
- allocate a key-value leaf within the third memory space and record the allocated key-value leaf address within the local log;
- update the put key-value operation-performed entry in the global log to indicate the allocated key-value leaf address;
- persist the key-value in the allocated key-value leaf; and
- update the put-key-value operation-performed entry in the global log to indicate satisfaction of the put-key-value request.

13. The system of claim 12, wherein the key-value is persisted in a persisted row, stored within persistent memory of the third memory space.

14. The system of claim 10, wherein the machine executable instructions are further executable to:

generate a remove-key-value store request, wherein the remove-key-value store request comprises at least the key-value store root address;

responsive to the remove-key-value store request:
- create a remove-key-value store operation-performed entry in the global log;
- free the key-value store name and the key-value store root address within the third memory space and update the local log to indicate that the key-value store name and the key-value store root address are freed;
- update the remove-key-value-store operation-performed entry in the global log to indicate that the key-value store name and the key-value store root address are freed; and
- remove the first key-value store name and the first key-value store root address from the meta key-value store.

* * * * *